Jan. 6, 1953 J. N. WHEELER 2,624,273

CHECKING MEANS FOR INTERPRETERS

Filed July 1, 1947 6 Sheets-Sheet 1

INVENTOR
JOHN N. WHEELER
BY
[signature]
ATTORNEY

CHECKING MEANS FOR INTERPRETERS

Filed July 1, 1947 6 Sheets-Sheet 2

INVENTOR
JOHN N. WHEELER
BY
ATTORNEY

Jan. 6, 1953 J. N. WHEELER 2,624,273

CHECKING MEANS FOR INTERPRETERS

Filed July 1, 1947 6 Sheets-Sheet 3

INVENTOR
JOHN N. WHEELER
BY J. J. Robbins
ATTORNEY

CHECKING MEANS FOR INTERPRETERS

Filed July 1, 1947 6 Sheets-Sheet 4

INVENTOR
JOHN N. WHEELER
BY J J Rohlin
ATTORNEY

Jan. 6, 1953 J. N. WHEELER 2,624,273

CHECKING MEANS FOR INTERPRETERS

Filed July 1, 1947 6 Sheets-Sheet 5

INVENTOR
JOHN N. WHEELER
BY J. J. Robbins
ATTORNEY

INVENTOR
JOHN N. WHEELER
BY
ATTORNEY

Patented Jan. 6, 1953 2,624,273

UNITED STATES PATENT OFFICE 2,624,273

CHECKING MEANS FOR INTERPRETERS

John N. Wheeler, Hawthorne, N. Y., assignor to International Business Machines Corporation, New York, N. Y., a corporation of New York Application July 1, 1947, Serial No. 758,354

7 Claims. (Cl. 101—2)

This invention relates to card interpreters which include printing means controlled by codal representations of items on record cards to print the items on the record cards.

It is desirable in such machines to check the accuracy with which the printing means has been controlled by the record cards. Various checking means are disclosed in the prior art. Patent 2,247,916 discloses comparatively complicated checking means for checking the accuracy of type bar setting with respect to groups of represented items. Patents 2,307,109 and 2,343,398 disclose checking means which involve the comparison of the item positions of counter wheels with the item positions of the type bars, both the counter wheels and the type bars being under common control of a single sensing means for the codal representations on the record cards. The checking means of the prior art either stops the machine or suppresses printing when an error is detected.

The present invention resides in improved and simplified checking means for a card interpreter. Further, the invention provides for separation of cards which have correctly controlled the printing means from those cards which have exercised incorrect control. According to the invention, after each card of a run is sensed at a main station for its item representations to control the setting of type carriers accordingly, the card is passed in the same cycle through a checking station at which it is again sensed for its item representations. Comparison circuits are closed under control of the sensing means at the checking station and under further control of the type carriers. These comparison circuits determine whether the type carriers were accurately set under control of the sensing means at the main station. If inaccuracy in the setting is found, the controlling card is directed by sorting means to one receiving pocket, printing on the card being incidentally suppressed. If accurate setting of the type carriers has been made, the printing operation takes place and the card is sorted to a different receiving pocket.

It is understood that the invention herein disclosed is in its broader aspects applicable to card-controlled machines in which recording may be done by punching or printing indicia, selected by the controlling cards, upon a medium or mediums remote from the controlling cards.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 8 is a section, on an enlarged scale, taken along lines 8—8 of Fig. 1.

The interpreter to which the invention has been applied as illustrative is, except for changes necessitated by the invention, similar to the interpreter disclosed in Patent 1,946,900 to G. F. Daly. The following description covers the inventive subject matter and pertinent parts of the patented interpreter.

Figure 1:
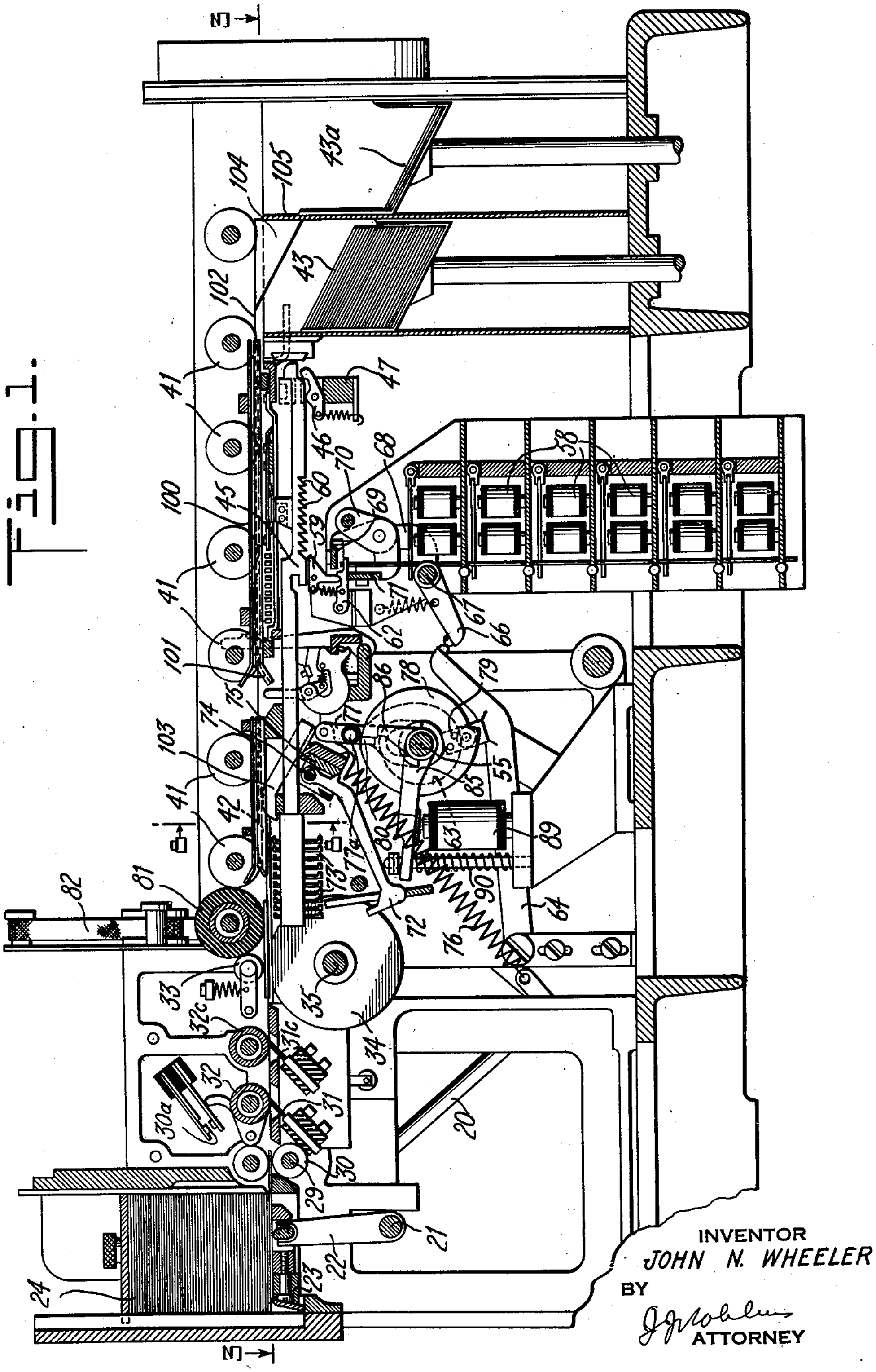
Fig. 1 is a vertical section through the machine.
Figure 2:
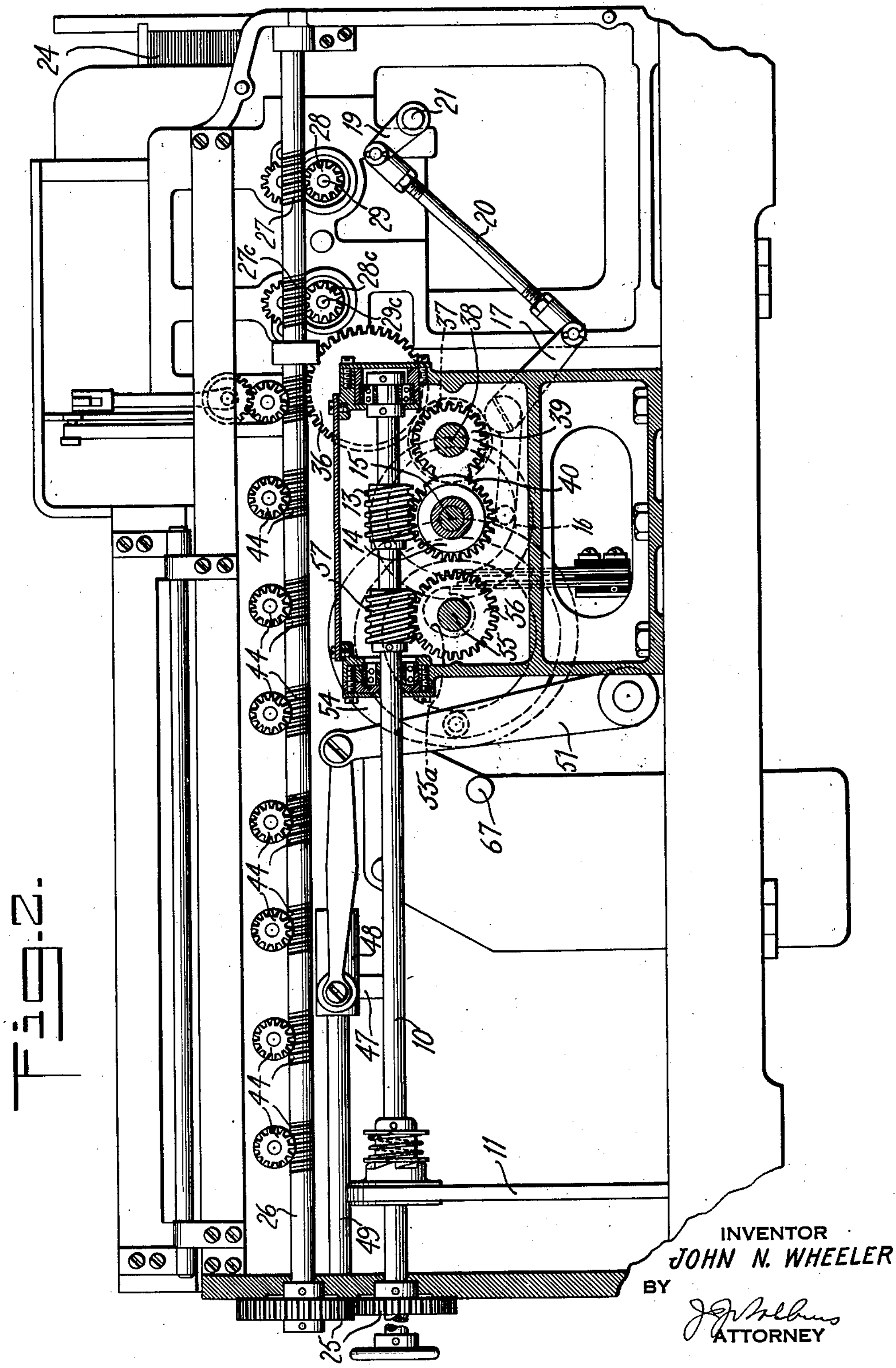
Fig. 2 is a sectional view of the drive side of the machine.
Figure 9:
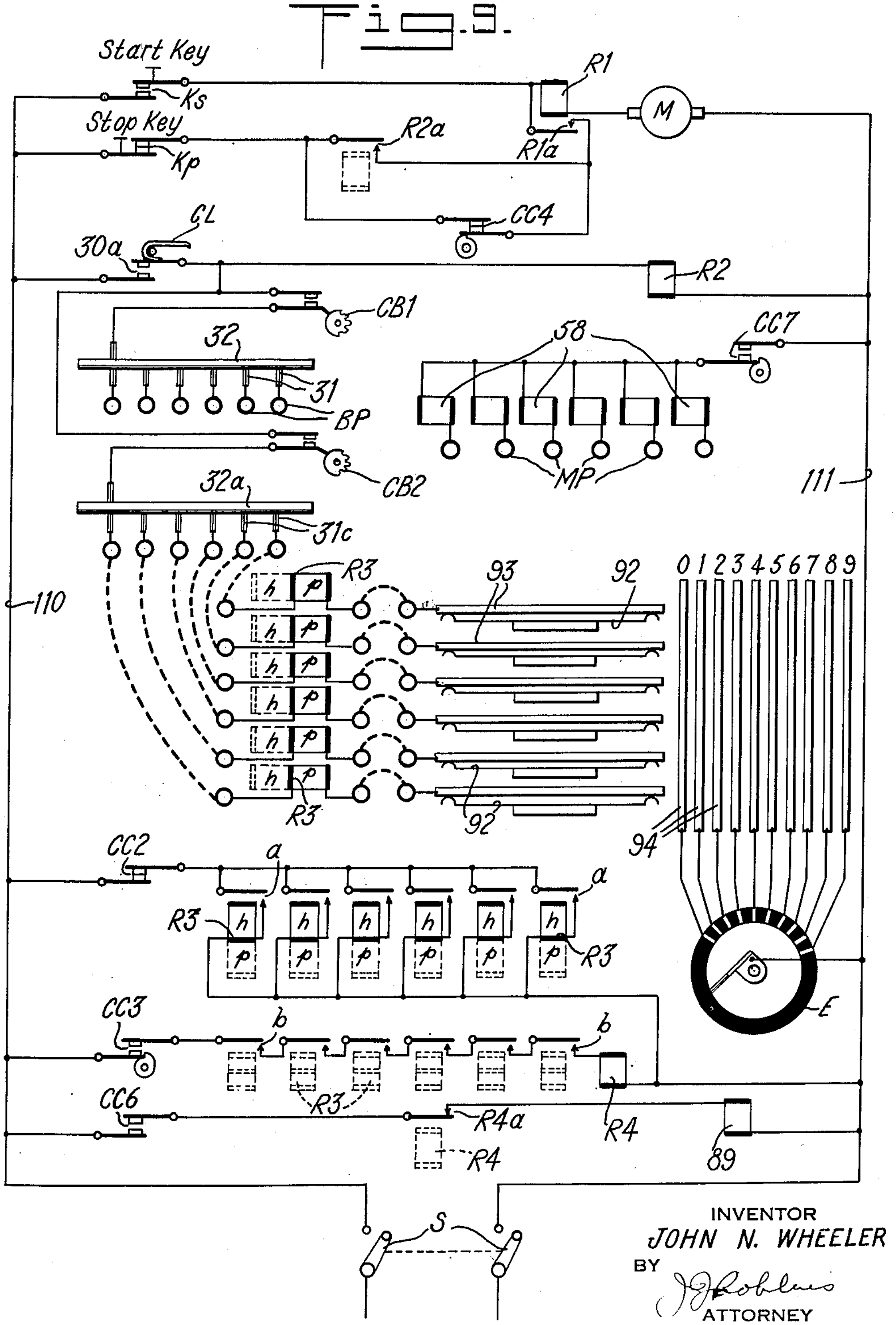
Fig. 9 is a circuit diagram.

Referring to Fig. 2, a main shaft 10 is driven through a belt 11 by a motor M shown only in the circuit diagram, Fig. 9. Shaft 10, through worm gearing 13, 14 continuously rotates a shaft 15. On shaft 15 is a box cam 16 acting on a follower lever 17, link 20 and arm 19 to rock a shaft 21. Shaft 21 carries a pair of arms 22 (Figs. 1 and 3) swiveled to picker slides 23. Each reciprocation of the picker slides feeds the bottom card out of the supply hopper 24 to upper and lower feed rolls 30. Feed rolls 30 are driven continuously by means which includes a shaft 26 (Figs. 2 and 3) connected by gears 25 to main shaft 10. Through worm gearing 27, 28, shaft 26 rotates the shaft 29 of lower feed roll 30 which is geared to the shaft of upper feed roll 30.

Feed rolls 30 continuously advance the card through the main sensing station at which are located the row of sensing brushes 31, one for each card column, and the common contact roll 32. In accordance with the invention, six machine cycle points later (see Fig. 5), the card enters the checking station at which are located a second row of sensing brushes 31c and a common contact roll 32c. The cards are stacked in the supply hopper 24 face down and so that the index positions 0, 1, 2, 3, etc. (see Fig. 6) will be successively sensed by the brushes 31 and thereafter by the brushes 31c. The contact roll 32c is rotated continuously by means including worm gearing 27c, 28c between shaft 26 (see Fig. 2) and a shaft 29c which is geared to the shaft of the contact roll 32c. Shaft 29c (also see Fig. 3) carries a narrow feed roller 30c, and an alined shaft 29d carries a similar roller 30d. The card is fed continuously through the checking station by the feed rolls 30 assisted by the contact roll 32c in cooperation with rollers 29c and 29d.

Figure 3:
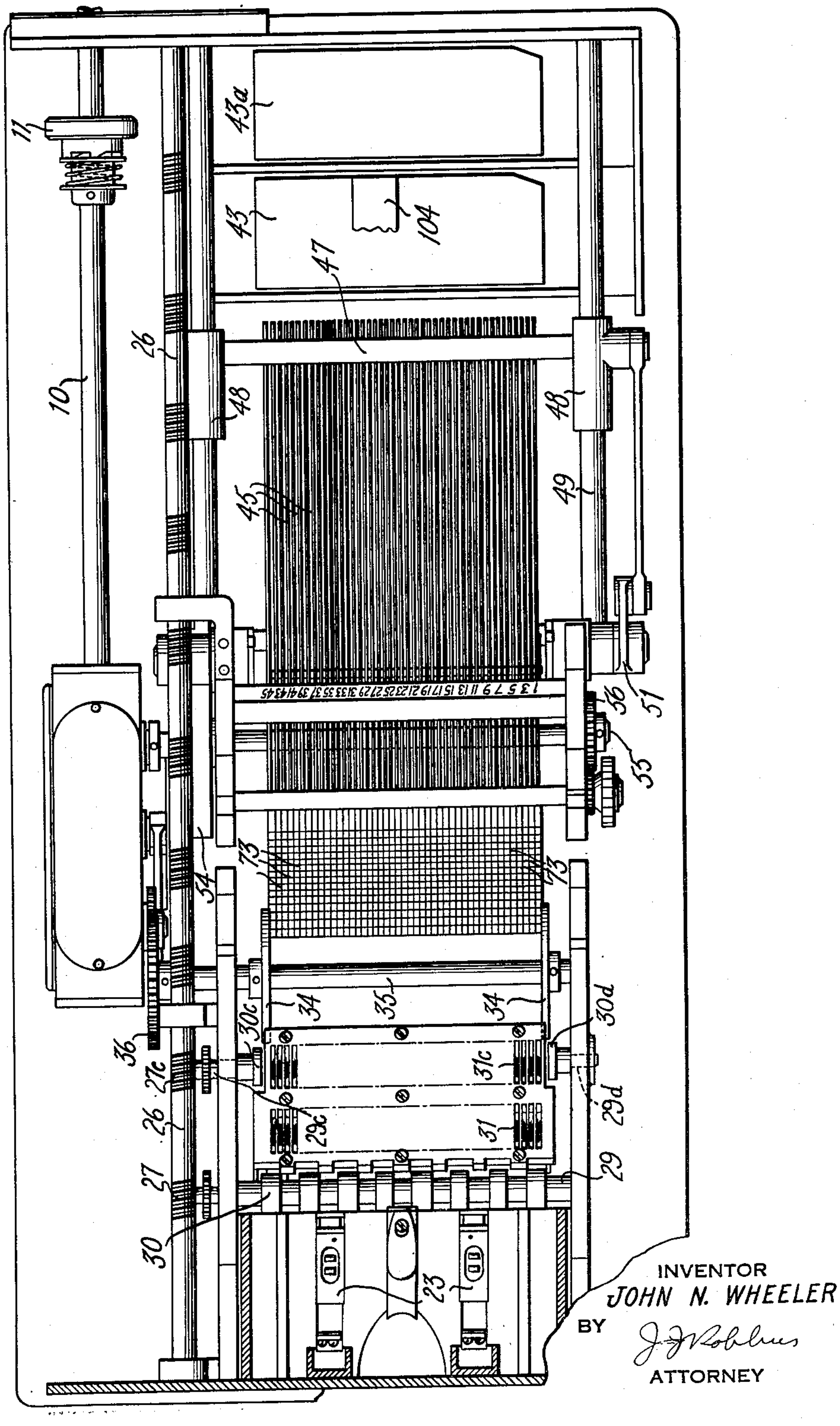
Fig. 3 is a plan view substantially along line 3—3 of Fig. 1.

The card proceeds from the checking station to a pair of feed rollers 33 and 34. Feed roller 33 is spring-pressed and feed roller 34 is intermittently driven. The feed rollers thus feed the card intermittently, advancing it to a printing position, then allowing the card to dwell at this position during printing, and then continuing the feed of this card past the printing position while feeding the following card to the printing position. The intermittent drive of feed roller 34 is effected by means including a gear 36 on shaft 35 of feed roller 34, a gear 37 meshed with gear 36 and fixed to a shaft 38, an interrupted driven gear 39 on shaft 38, and a coacting interrupted drive gear 40 on continuously rotating shaft 15 (see Fig. 2). During rotation of shaft 15, the gear 40 picks up gear 39 to cause operation of feed roller 34 for advancing the card, by coaction with roller 33, to the printing position. The toothless portion of gear 40 then rides along the toothless portion of gear 39, locking the latter gear and thereby, locking the feed roller 34, against movement during the period of the cycle in which printing is to occur. After this short period of the cycle, the gear 40 again picks up the gear 39 to cause feed rollers 33 and 34 to continue the feed of the card past the printing position. Ejection of the card is effected by successive rollers 41 in coaction with tracks 42 (see Figs. 1 and 8). Rollers 41 are continuously rotated by worm gearing 44 between the shafts of these rollers and the shaft 26 (Fig. 2). According to the invention, the card will be selectively sorted to a pocket 43 or a pocket 43a (Figs. 1 and 3). Cards which have correctly controlled the printing means and consequently have the interpretations printed thereon are directed to pocket 43. Any card which incorrectly controlled the printing means does not have the interpretation printed thereon and is directed to pocket 43a. Before describing the selective sorting of the cards to the pockets 43 and 43a, the printing means will be described.

The printing means includes type bars 45 (Figs. 1, 3, and 4), one for each card column, and mounted in the frame for horizontal travel below the card path. Actuation of the type bars is effected by means including a reciprocatable crosshead 47. The crosshead is connected at its ends to blocks 48 slidable upon rods 49 and having pivoted link connection to a follower 51 of a box cam 54 on a shaft 55. Shaft 55 is driven continuously by worm gearing 56, 57 from the main shaft 10 (see Fig. 2). The type bars 45 are releasably coupled by individual pawls 46 to crosshead 47 to be driven towards the left (Fig. 1) upon the leftward stroke of the crosshead. The type bars will be differentially positioned under control of the main sensing means during this stroke of the crosshead. Subsequently, upon the return stroke of the crosshead, it will pick up all the type bars and restore them to their initial positions. The actuation of the type bars towards the left (Fig. 1) is synchronized with the travel of index positions 0, 1, 2, 3, etc. of the card (see Fig. 6) past the main sensing brushes 31. Upon a perforation being sensed in a card column, a circuit traced later energizes a magnet 58, one such magnet being provided for each card column. The magnet, upon energization, releases a detent 62 from a dog 59 which thereupon springs into engagement with a tooth 60 of the type bar related to the controlling card column. The type bar is thus arrested in a position corresponding to the controlling perforation. In this manner, the plurality of type bars are differentially settable according to the item representing perforations. They remain so set until after the printing time of a machine cycle. Meanwhile, the controlling card is fed past the checking brushes 31c and to the printing position where it idles until after the printing time has elapsed. After printing time, dogs 59 are withdrawn from the teeth 60 of the type bars and relatched by detents 62, and the crosshead 47 then operates to restore the type bars to home positions. The means for releasing dogs 59 from the teeth 60 and relatching them with detents 62 includes a cam 63 (Fig. 1) on shaft 55. Follower 64 of cam 63 abuts an upwardly spring-urged arm 66 on a shaft 67. On shaft 67 is another arm 68 which carries a restoring bar 69 for dogs 59 and which is pivotally connected to a lever 70 which carries a restoring bar 71 for detents 62. At the proper time, cam 63 acts upon the follower 64 and arm 66 to rock shaft 67 and arm 68 counterclockwise (Fig. 1). Arm 68, in turn, rocks lever 70 clockwise. Thus, bar 69 on arm 68 moves to the left to engage and withdraw dogs 59 from the type bars, while bar 71 moves upwardly to return detents positively into their latching engagement with the restored dogs 59.

Each type bar 45 carries a set of individual types 73, one type for printing each character which may be codally designated in a card column. For each type bar, there is one hammer 72. The hammers 72 are pivotally mounted on a rod 74 mounted on an oscillatable bar 75. Bar 75 is pivoted on the machine frame by pintles coaxial with rod 74. Springs 76 bias the bar 75 clockwise (Fig. 1). Pivotally connected to the middle of bar 75 is a cam follower 77 bifurcated to straddle the shaft 55 and provided with a roller 77a engaged with a cam 78 fixed to shaft 55. Projecting from one face of cam 78 is a lug 79 for coacting with a projection 80 of follower 77. The contour of cam 78 (see Fig. 5) is such that in each machine cycle, the cam gradually lifts follower 77 to rock the bar 75 counterclockwise (Fig. 1), tensioning springs 76 and retracting the hammers 72. As the high point of cam 78 leaves follower roller 77a, the lug 79 moves under the projection 80 to support the follower momentarily in raised position. Lug 79 soon passes projection 80, allowing the springs 76 to release their tension and effect snap clockwise movement of bar 75 and abrupt drop of follower 77 to the low cam level. This snap action of bar 75 impels hammers 72 against the types 73 in printing position to effect printing on the controlling card through an ink ribbon. 81 designates the usual platen roller and 82 designates the ink ribbon which is fed and guided in conventional manner.

Means are provided to suppress printing if the checking means finds that the type bars have been incorrectly set. The print suppressing means per se is similar to that disclosed in Patent 2,343,398 and includes a bell crank lever 85 rotatably carried by shaft 55 (Fig. 1). The horizontal arm of lever 85 carries the armature of a magnet 89 which will be energized under control of the checking means constructed according to the present invention. A spring 90 normally maintains lever 85 in Fig. 1 position in which its vertical arm 86 is to one side of the path of projection 80 of the cam follower 77. Energization of magnet 89 results in positioning arm 86 directly below projection 80. Now, as the high point of cam 78 leaves roller 77*a*, the projection 80 drops upon the top of arm 86 which then supports the follower 77 in raised position. With the follower in this position, the projection 80 is outside the path of lug 79 and the lug freely travels past the projection. Since the follower 77 is being sustained in raised position by arm 86, the tensioned springs 76 cannot rock the bar 75 to impel the hammers 72 against the types 73. In this manner, printing is suppressed in the cycle in which magnet 89 has been energized. Magnet 89 will be energized for only a short period but the spring 90 is not strong enough to overcome the pressure exerted by projection 80, under the influence of tensioned springs 76, upon the top of arm 86. In the following cycle, as the high point of cam 78 again comes around to the roller 77*a*, it lifts the follower 77 to its highest position, whereupon projection 80 rises from the top of 86, allowing spring 90 to restore the arm to its normal position (Fig. 1).

As previously stated, a feature of this invention is the selective sorting of interpreted cards and non-interpreted cards, the latter being the cards for which the type bars were incorrectly set. The interpreted cards will be routed to a delivery pocket 43 and the non-interpreted cards to a delivery pocket 43*a*. Inasmuch as several machine cycles elapse between the checking of a card and its arrival at the delivery pockets, the selective routing of the cards if attempted at the delivery end would require means to hold the checking result with respect to each card for several cycles According to the invention, the complications of delay means are obviated by effecting the selective routing of each of the cards during the same machine cycle in which the card is checked and interpreted or not interpreted according to the checking result. This selective routing of the cards will occur shortly after the card leaves the printing position.

Figure 7:
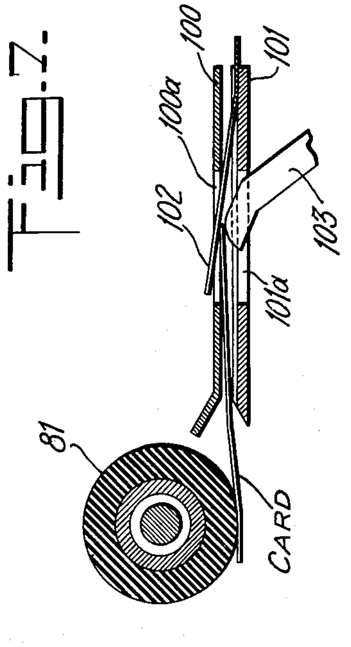
Fig. 7 is a detail view of a portion of the card sorting means.

Referring now particularly to Figs. 7 and 8, the routing or sorting means for the cards includes a narrow, card guiding structure located centrally between and running parallel to the side tracks 42. The card guiding structure comprises upper and lower guides 100 and 101 and a flexible blade 102. The left hand end or entrance end of this guiding structure is near the left hand eject roller 41. Upper guide 100 is in two longitudinal sections, just as each of the tracks 42, and each section is a flat plate. The lower guide 101 is similarly in two sections, but each is a channeled plate. Flexible blade 102 lies in the channels and extends rearwardly past the upper and lower guides and is anchored to a block 104 which is fixed to partition 105 between pockets 43 and 43*a* (see Fig. 1). The flexure of blade 102 is such that its left end normally rests upon the bottom of lower guide 101. The guide 101 is formed with a narrow slot 101*a* overlapped by the left end of the blade 102. The upper, rounded end of a blade lifting arm 103 extends into the slot 101*a*. The arm 103 is secured at its lower end to the bar 75. Upper guide 100 is formed above the left end of blade 102 with a slot 100*a* wide enough to allow the left end of the blade to pass through when lifted by the arm 103. As previously explained, during each machine cycle, bar 75 is rocked to its counterclockwise limit under control of cam 78 after which it is abruptly returned clockwise by springs 76 to effect printing provided magnet 89 has not been energized. Magnet 89 will remain deenergized if the checking means determines that the card at printing position has brought about a correct setting of the type bars, and the magnet will be energized if the checking means has found the type bars to be incorrectly set. In the latter event, bar 75 will remain in substantially extreme counterclockwise position until after the leading edge of the card passes the left end of flexible blade 102. Likewise, the blade lifting arm 103, secured to bar 75, will be in substantially extreme counterclockwise position, allowing the left end of the blade 102 to remain down inside the lower, channeled guide 101 and below the tracks 42. Accordingly, the card will travel above the blade 102 and will be guided between the blade and the sections of upper guide 100 and thence ejected by rollers 41, in cooperation with tracks 42, to the pocket 43*a*. If the checking means has found the setting of the type bars to be correct, it will not cause magnet 89 to be energized. Consequently, bar 75 will be allowed to return clockwise, under the influence of springs 76, to cause the printing operation to take place and will remain in its extreme clockwise position until after the card has passed the entrance end of blade 102. Likewise, blade lifting arm 103 will be in the extreme clockwise position, shown in Fig. 7, in which it lifts the entrance end of the blade 102 above the sides of lower, channeled guide 101 and above the level of tracks 42. Accordingly, the card will move under the blade 102 and over the rounded end of arm 103 and will be guided to the pocket 43.

In the foregoing manner, interpreted cards are routed to pocket 43 while the non-interpreted cards are routed to pocket 43*a*.

Figure 4:
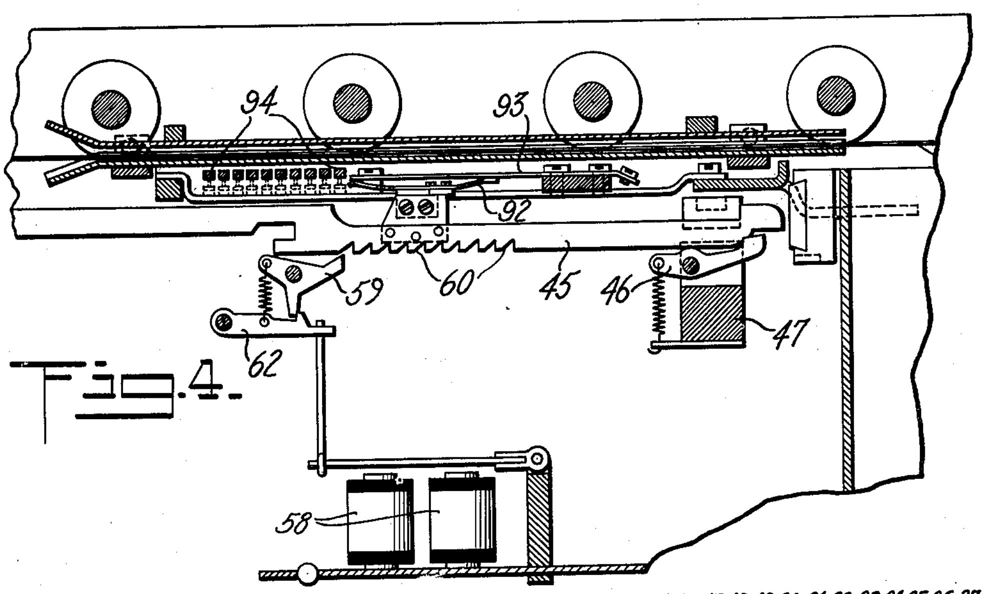
Fig. 4 is a detail view of contact means associated with the type carrying bars and which contact means participate in the checking operation.

The checking means of the present case utilizes, in part, a known circuit closing structure associated with the type bars 45. Referring particularly to Fig. 4, this circuit closing structure includes a spring metal contact wiper 92 suitably mounted on each type bar 45 and in all positions of the type bar maintaining engagement with a conductive strip 93 extending parallel to the type bar. There is one wiper 92 and strip 93 for each type bar. To the left of all the strips 93 is a set of contact bars 94 extending crosswise of the machine and suitably mounted to the machine frame. The bars 94 are spaced the same as the differential positions of the type bars and are selectively engaged by the wipers 92 in accordance with the differential positions of the type bars. For example, any one or more of the type bars set in first differential position, in which their O types are at printing position, have their wipers 92 engaged with the first right hand contact bar 94.

Before describing the circuits, it is pointed out that the machine is provided with the conventional card lever contacts 30*a* (Fig. 1) maintained closed by the cards as long as they continue to issue from the supply hopper 24. Further, shaft 55 has fixed to it cams such as 55*a* (Fig. 2) for operating cam contacts generally designated CC and circuit breakers generally designated CB appearing in the circuit diagram (Fig. 9). Also fixed to shaft 55 is the brush of an emitter E appearing in the circuit diagram.

The circuits and operation of the machine will now be explained.

Referring to Fig. 9, line switch S, when closed, connects the opposite circuit lines 110 and 111 to a suitable D. C. supply. To start a run of cards through the machine, the operator depresses the start key, closing key contacts Ks. This completes a circuit through a relay R1 and the drive motor M. With motor M now in operation, it continuously drives main shaft 10 and the shafts geared thereto (see Fig. 2), and the picker slides 23 (see also Figs. 1 and 3) will operate to feed cards from the supply hopper 24. Relay R1 closes contacts R1*a* which together with cam contacts CC4 (see also Fig. 5) and stop key contacts K*p*, establish a shunt circuit for relay R1 and motor M. The start key is held down long enough to insure closure of the card lever contacts 30*a* (Fig. 1) by the first card issued from hopper 24. Contacts 30*a* upon closure complete a circuit through a relay R2 (Fig. 9), whereupon contacts R2*a*, paralleling contacts CC4, close. The operator may now release the start key since relay R1 and motor M will be kept energized by the shunt circuits until the cards run out and CC4 opens.

Figure 5:
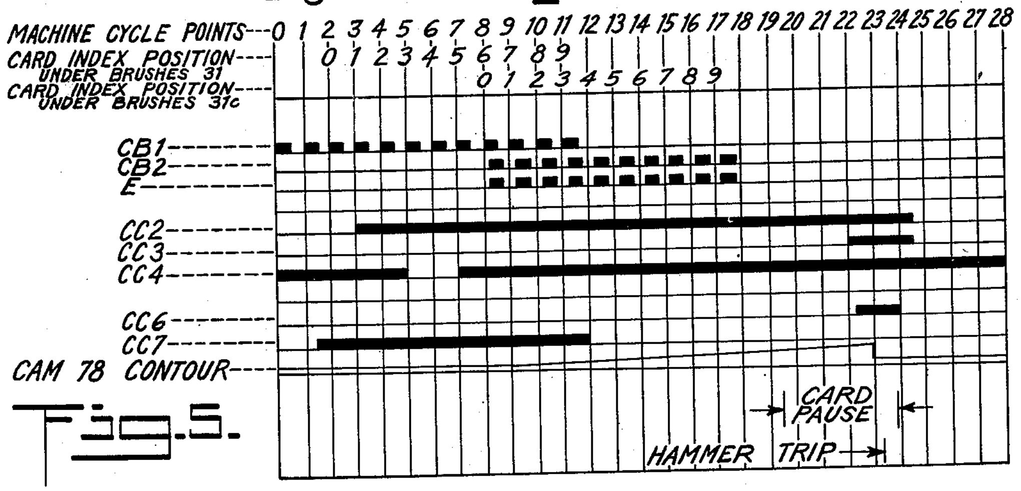
Fig. 5 is a timing chart of pertinent elements.
Figure 6:
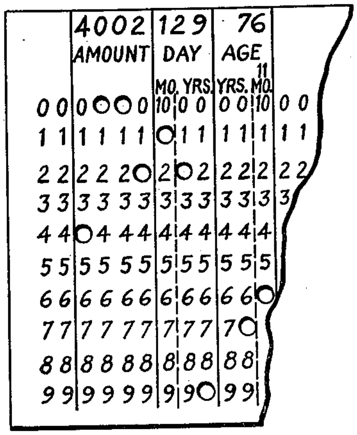
Fig. 6 shows a fragment of an interpreted card.
Figure 6:
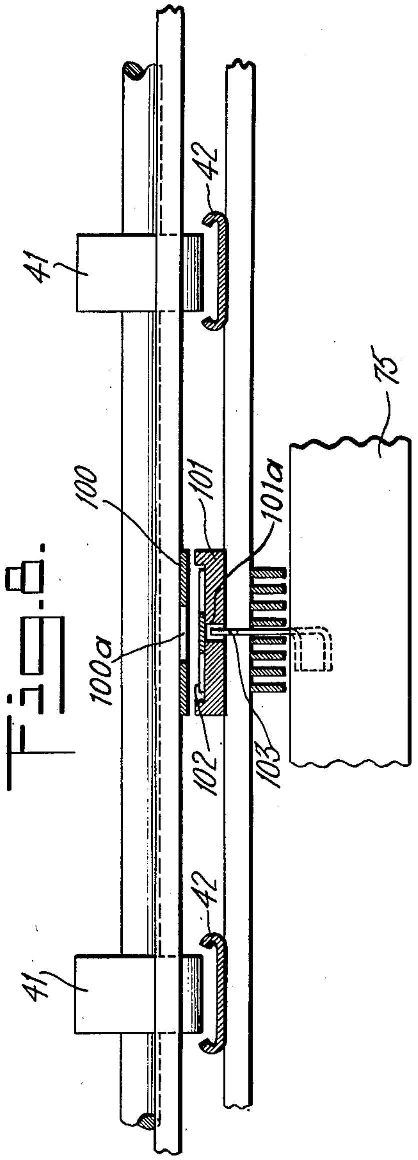

Each card issued from supply hopper 24 (Fig. 1) is fed in a single machine cycle (see Fig. 5) first through the main sensing station, then through the checking station and to the printing station. The card pauses at the printing station until after the printing time which falls in the same machine cycle. Feed of the card is then resumed to advance it past the entrance end of the card routing structure 100, 101, 102 (Fig. 7) before the end of the cycle. The order in which the index positions of the card pass the main sensing brushes 31 and then the checking brushes 31*c* is indicated in Fig. 5. It is noted that each index position passes a sensing brush 31*c* six machine cycle points after the same index position has passed the same column sensing brush 31. As the card traverses the main sensing station, the brushes 31, in cooperation with contact roll 32, complete control circuits at differential times corresponding to the locations of the perforated index positions of the card. Referring to Fig. 9, such control circuit extends from line 110 through card lever contacts 30*a* (now closed), circuit breaker contacts CB1, contact roll 32, a brush 31, plugging (not shown) between the brush plug socket BP and a socket MP, thence through the type bar positioning magnet 58 wired to said socket MP, and via cam contacts CC7 to line 111. Proper operation will result upon energization of magnet 58 in stopping the related type bar 45 (see Fig. 3) in correct differential position corresponding to the controlling perforation and in such position, the type bar will present at the printing position the type 73 (see Fig. 1) of the character represented by the controlling perforation. Further, in correct differential position of the type bar, wiper 92 mounted on the type bar is in engagement with the contact bar 94 corresponding to the controlling perforation. For example, a "2" perforation in a card column when sensed by a brush 31 should energize the magnet 58 plugged to the brush to cause the related type bar to stop in a differential position in which its "2" type is at printing position and its wiper 92 engaged with the "2" bar 94 (see Fig. 9). Six cycle points after the controlling perforation is sensed by a brush 31 it is sensed by a checking brush 31*c*. Upon the brush 31*c* sensing the perforation, it completes a checking circuit provided the type bar has been correctly positioned. Thus, to continue with the example of a 2 perforation, the sensing by brush 31*c* of this perforation, provided the type bar is in the correct "2" position, completes the following circuit: Line 110, 30*a*, CB2, 32*a*, 31*c*, plug connection, pick up coil *p* of a duo wound relay magnet R3, plug connection, contact strip 93, wiper 92 of the type bar being checked, "2" bar 94, emitter E, and line 111.

Energized coil *p* of relay R3 closes contacts R3*a* to establish the circuit of companion hold coil *h* of the relay by way of CC2 and said contacts R3*a*. If all of the type bars have been correctly positioned, all the relays R3 plugged into circuit will be in operated status before the 18th machine cycle point and will remain in this status until CC2 opens shortly before the 25th machine cycle point (see Fig. 5). All the contacts R3*b* therefore will be in a closed condition during the closure time of CC3, so that a relay R4 will be energized. The circuit of relay R4 will make before CC6 closes. Closure of CC6 overlaps the printing time and is ineffective to complete a circuit through the magnet 89 (also see Fig. 1) while relay contacts R4*a* are open, as is the case if relay R4 has been energized. With magnet 89 remaining deenergized, the printing operation will be allowed to take place and the guide blade 103 (see also Figs. 7 and 8) will be lifted to guide the card, after the printing operation, to the delivery pocket 43.

If any of the type bars 45 has not been correctly positioned, its wiper 92 will not be engaged with the proper contact bar 94. Accordingly, a circuit such as the one traced before will not be completed through coil *p* of a relay R3. The coil *h* of this relay R3 will not be energized, the *b* contacts of the relay will not be closed and, hence, the circuit of the relay R4 will be unable to make. Accordingly, the contacts R4*a* will remain closed and upon closure of CC6, the magnet 89 will be energized. Energization of magnet 89 suppresses the printing operation and causes the non-interpreted card to be directed, in the manner previously described, to the pocket 43*a*.

While there have been shown and described and pointed out the fundamental novel features of the invention as applied to a preferred embodiment, it will be understood that various omissions and substitutions and changes in the form of details of the device illustrated and in its operation may be made by those skilled in the art, without departing from the spirit of the invention. It is the intention, therefore, to be limited only as indicated by the scope of the following claims.

What is claimed is:

1. In a machine having elements at a main station for sensing index positions of a record for item representations, means to feed records successively to said station, and recording devices differentially settable under control of said elements according to item representations sensed thereby upon a record; means for checking the accuracy of the setting of the recording devices and including a checking station comprising supplemental sensing elements and so positioned with respect to the sensing elements at the main station to resense a record for item representations after such item representations of the same record have been sensed by the sensing elements at the main station and while the following index positions of the same record are being sensed at the main station, comparing means under cojoint control of the supplemental sensing elements according to the item representations resensed on a record and by the recording devices according to their setting for detecting, at the time the supplemental sensing elements are resensing the item representations and the recording devices are being set under control of said elements at the main station, matching or non-matching relations between the resensed item representations and the setting of the recording devices, and means controlled selectively by the comparing means for separating the records found to have a matching relation to the setting of the recording devices from the records found to have a non-matching relation.

2. In a machine having elements at a main station for sensing index positions of a record for item representations, means to feed records successively to said station, and recording devices differentially settable under control of said elements according to item representations sensed thereby upon a record; means for checking the accuracy of the setting of the recording devices and including a checking station comprising supplemental sensing elements and so positioned with respect to the sensing elements at the main station to resense a record for item representations after such item representations of the same record have been sensed by the sensing elements of the main station and while the following index positions of the same record are being sensed at the main station, comparing means under cojoint control of the supplemental sensing elements according to the item representations resensed on a record and by the recording devices according to their setting for detecting, at the time the supplemental sensing elements are resensing the item representations and the recording devices are being set under control of said elements at the main station, matching or non-matching relations between the resensed item representations and the setting of the recording devices, a pair of receiving stations for the records, means for directing the records operated upon to either of said stations, and means under selective control of said comparing means for selectively operating said directing means to direct those records which have correctly set the recording devices to one of said stations and to direct those records which have incorrectly set the recording devices to the other of said stations.

3. In a machine having sensing elements at a main station for sensing index positions of a record for item designations, means to feed records in succession to said station, and recording means with recording devices differentially settable under control of said sensing elements according to the designations sensed on a record; means for checking the accuracy of the setting of the recording devices and including a checking station comprising supplemental sensing elements and so positioned with respect to the sensing elements at the main station to resense a record for item designations after such item designations of the same record have been sensed by the sensing elements at the main station and while the following index positions of the same record are being sensed at the main station, a contact arrangement for electrically representing the setting of the recording devices and including elements operated by the recording devices for conditioning the contact arrangement to represent the setting of the recording devices, comparing circuits jointly controlled by the supplemental sensing elements according to the item designations resensed on the record and by said contact arrangement according to the electrical representation thereby of the setting of the recording devices to compare, at the time the supplemental sensing elements are resensing the item designations and the recording devices are being set under control of the sensing elements at the main station, the setting of the recording devices and the resensed designations for agreement or disagreement, and machine function control means selectively governed by said checking circuits according to the comparison result.

4. In an interpreter having means to feed each of successive records through a main sensing station and thereafter to a printing position, elements at the main sensing station for sensing index positions of each record for item designations, and printing means including type carriers differentially settable under control of said elements according to the sensed designations to present types corresponding to said designations at the printing position; means to check the accuracy of the setting of the type carriers and including a checking station comprising supplemental sensing elements and so positioned with respect to the sensing elements at the main station to resense a record for item designations after such item designations of the same record have been sensed by the sensing elements at the main station and while the following index positions of the same record are being sensed at the main station, means for representing the setting of the type carriers, and including members selectively positionable by the type carriers according to their setting, comparing means jointly controlled by the supplemental sensing elements and said representing means for comparing, at the time the supplemental sensing elements are resensing the item designations and the type carriers are being set under control of said elements at the main station, the setting of the type carriers and the item designations with respect to agreement or non-agreement, record guiding means having an entrance end adjacent to and following the printing position, said guiding means including a separator positionable at said entrance end selectively above or below the plane of the record at the printing position, so that when the separator is positioned above said plane, the record will be guided below the separator and when the separator is positioned below said plane, the record will be guided above the separator, means for ejecting each record from the printing position to said guiding means and above or below the separator depending on the position of the separator, and means under control of the comparing means according to the comparison result for selectively positioning said separator.

5. In a cyclically operating interpreter having elements at a main station to sense index positions of each of successive records, one record a cycle, for item designations, printing means for printing an interpretation of the designations upon each record and including type carriers differentially settable under control of the sensing elements to present types corresponding to the designations at a printing position and also including cyclically timed impression-taking means selectively effective to cooperate with the types in printing position to effect printing therefrom upon the sensed record, and cyclic means for feeding each of successive records in each of successive cycles first past sensing elements and thereafter to a printing position to have the interpretation of its designations printed thereon; means to check the setting of the type carriers and including a checking station comprising supplemental sensing elements and so positioned with respect to the sensing elements at the main station to resense a record for item designations after such item designations of the same record have been sensed by the sensing elements at the main station and while the following index positions of the same record are being sensed at the main station, comparing circuits jointly controlled by the supplemental sensing elements according to the resensed designations and by the type carriers according to their setting to detect, at the time the supplemental sensing elements are resensing the item designations and the type carriers are being set under control of said elements at the main station, agreement or disagreement between the designations and said setting, means to selectively direct the record along one or another path and positioned to receive the record after passing the printing position and before a next record is sensed by the first-named elements, and means controlled by the comparing means according to the comparison result for governing the record directing means to selectively direct the record to one or another path and for also governing the impression-taking means to be effective or ineffective according to the comparison result.

6. In a cyclically operable machine having elements at a main station for sensing a record for item representations at differential times, means to feed records successively to said sensing elements, recording devices differentially settable under control of said elements according to item representations sensed thereby during a cycle to present types corresponding to the sensed representations at a printing position, cyclically operable printing means selectively rendered effective at a time in a cycle for cooperating with the types at printing position to effect printing therefrom, a checking station comprising supplemental sensing elements so located with respect to the position of the sensing elements at the main station as to cause sensing of item representations of one record at other differential times which are later in the same cycle than the differential times the same representations of the same record have been earlier sensed by the sensing elements at the main station, a plurality of settable means, one of which is settable under control of said recording devices at said differential times and stored up during said other differential times and the other of which is settable under control of the elements at the checking station at said other differential times, means associated with the plurality of settable means and operable at said other differential times for determining whether the amount stored up on the settable means which is under control of the recording devices corresponds with the amount on the other settable means which is under control of the elements at the checking station, and means under control of said last named means upon detecting a lack of correspondence for suppressing the operation of said printing means.

7. In an interpreter having means to feed each of successive records through a main sensing station and thereafter to a printing position, elements at the main sensing station for sensing each record for item designations at differential times and printing means including type carriers differentially settable under control of said elements according to the sensed designations to present at the printing position types corresponding to said designations, a checking station comprising supplemental sensing elements so located with respect to the position of the sensing elements at the main station as to cause sensing of item designations of one record at other differential times which are later in the same cycle than the differential times that the same designations of the same record have been earlier sensed by the sensing elements at the main station, a plurality of settable means, one of which is settable under control of said type carriers at said differential times and stored up during said other differential times and the other of which is settable under control of the elements at the checking station at said other differential times, means associated with the plurality of the settable means and operable at said other differential times for determining whether the amount stored up on the settable means which is under control of the type carriers corresponds or does not correspond with the amount on the other settable means which is under control of the elements at the checking station, and machine function control means selectively controlled by the last named means according to the correspondence or lack of correspondence.

JOHN N. WHEELER.

REFERENCES CITED

The following references are of record in the file of this patent:

UNITED STATES PATENTS

| Number | Name | Date |
|---|---|---|
| 1,853,215 | Lorant | Apr. 12, 1932 |
| 2,122,136 | Fuller | June 28, 1938 |
| 2,131,917 | Mills | Oct. 4, 1938 |
| 2,150,208 | Daly | Mar. 14, 1939 |
| 2,234,263 | Lake | Mar. 11, 1941 |
| 2,247,916 | Lake | July 1, 1941 |
| 2,307,109 | Bryce | Jan. 5, 1943 |
| 2,343,398 | Bryce | Mar. 7, 1944 |
| 2,359,616 | Bryce | Oct. 3, 1944 |
| 2,388,354 | Wheeler | Nov. 6, 1945 |
| 2,412,527 | Mills | Dec. 10, 1946 |
| 2,540,026 | Daly | Jan. 30, 1951 |